(12) United States Patent
Le Rouzic et al.

(10) Patent No.: US 8,739,267 B2
(45) Date of Patent: May 27, 2014

(54) METHOD AND SYSTEM FOR COMMUNICATION BETWEEN A SECURE INFORMATION STORAGE DEVICE AND AT LEAST ONE THIRD PARTY, AND CORRESPONDING ENTITY, DEVICE AND THIRD PARTY

(75) Inventors: Jean-Pierre Le Rouzic, Rennes (FR); Gilles Macariot-Rat, Vanves (FR); Thierry Leclercq, Paris (FR); Vincent Barnaud, Paris (FR)

(73) Assignee: France Telecom, Paris (FR)

( * ) Notice: Subject to any disclaimer, the term of this patent is extended or adjusted under 35 U.S.C. 154(b) by 1845 days.

(21) Appl. No.: 11/666,585

(22) PCT Filed: Sep. 7, 2005

(86) PCT No.: PCT/FR2005/002233
§ 371 (c)(1),
(2), (4) Date: May 13, 2008

(87) PCT Pub. No.: WO2006/048515
PCT Pub. Date: May 11, 2006

(65) Prior Publication Data
US 2009/0049521 A1    Feb. 19, 2009

(30) Foreign Application Priority Data

Oct. 29, 2004  (FR) ..................... 04 11625

(51) Int. Cl.
*G06F 21/00* (2013.01)
(52) U.S. Cl.
USPC ............. 726/12; 713/156; 713/170; 713/172; 713/182; 455/456; 726/4; 726/15; 380/255; 705/7; 705/14
(58) Field of Classification Search
CPC ............................ H04L 63/08; H04L 63/0272
USPC .......................................................... 726/4
See application file for complete search history.

(56) References Cited

U.S. PATENT DOCUMENTS 4,849,614 A * 7/1989 Watanabe et al. ............. 235/379
7,310,734 B2 * 12/2007 Boate et al. .................... 713/186
(Continued)

FOREIGN PATENT DOCUMENTS

EP    1 117 077    7/2001

OTHER PUBLICATIONS

Towards the Integration ofWeb Services Security|http://ieeexplore.ieee.org/stamp/stamp.jsp?tp=&arnumber=994567|Pages 1-10|2002|Nakamur et al|.*

(Continued)

*Primary Examiner* — Mahfuzur Rahman
(74) *Attorney, Agent, or Firm* — David D. Brush; Westman, Champlin & Koehler, P.A.

(57) ABSTRACT

The disclosure relates to a method for communication between a secure information storage device and at least one third party with which information is exchanged. An entity ensures the management of a plurality of secure information storage devices to which said device pertains. The method includes the following steps: the entity places, in a secure container which is arranged in the device and specific to a third party, an authorization for communication between the secure container and the given third party; the entity sends an identifier of the device, an address of the device, an identifier of the secure container, and the authorization to communicate, to the give third party; the given third party attempts to establish communication with the secure container, using the address of the device, the identifier of the device, the identifier of the secure container, and the authorization to communicate; and, before accepting said communication, the device checks that the authorization to communicate transmitted by the third party is acceptable in view of the authorization to communicate previously placed in the secure container by the entity.

15 Claims, 2 Drawing Sheets

(56) References Cited

U.S. PATENT DOCUMENTS

| | | | |
|---|---|---|---|
| 7,593,605 B2 * | 9/2009 | King et al. | 382/313 |
| 2001/0029579 A1 * | 10/2001 | Kusakabe et al. | 713/172 |
| 2002/0040438 A1 * | 4/2002 | Fisher, Jr. | 713/200 |
| 2002/0104006 A1 * | 8/2002 | Boate et al. | 713/186 |
| 2002/0160790 A1 * | 10/2002 | Schwartz et al. | 455/456 |
| 2004/0097217 A1 * | 5/2004 | McClain | 455/411 |
| 2005/0246292 A1 * | 11/2005 | Sarcanin | 705/67 |
| 2005/0269402 A1 * | 12/2005 | Spitzer et al. | 235/380 |
| 2007/0005967 A1 * | 1/2007 | Mister et al. | 713/168 |
| 2007/0082703 A1 * | 4/2007 | Van Kleef | 455/558 |
| 2010/0257357 A1 * | 10/2010 | Mcclain | 713/155 |

OTHER PUBLICATIONS

Written Opinion from counterpart PCT application No. PCT/FR2005/002233 filed Sep. 7, 2005.

French Search Report from counterpart foreign application No. FR 0411625 filed Oct. 29, 2004.

Global Platform Smart Card Management System Functional requirement, version 4.0.

\* cited by examiner

METHOD AND SYSTEM FOR COMMUNICATION BETWEEN A SECURE INFORMATION STORAGE DEVICE AND AT LEAST ONE THIRD PARTY, AND CORRESPONDING ENTITY, DEVICE AND THIRD PARTY

CROSS-REFERENCE TO RELATED APPLICATION

This Application is a Section 371 National Stage Application of International Application No. PCT/FR2005/002233, filed Sep. 7, 2005 and published as WO 2006/048515 on May 11, 2006, not in English.

FIELD OF THE DISCLOSURE

The field of the disclosure is that of secure information storage devices placed at the disposal of individuals (also called holders) by an entity that manages these devices (also called an operator of the devices).

More specifically, the disclosure pertains to a method and a system of communications between a device for the secure storage of information (hereinafter called a secure information storage device) and at least one third party.

A secure information storage device is made, for example, in the form of a smart card, a dongle (such as a USB stick) or any other hardware or software device. It typically comprises at least one secure container storing information (data and/or programs) intended for use by a third party when it communicates with this device, to provide one or more functions.

For simplicity's sake, here below in the description, the term "entity" is understood to be any means (hardware and/or software) available to this entity to play its role in the system. Similarly, the term "third party" is understood to be any means (hardware and/or software) available to this third party in order to play its role in the system.

The entity, the third party and the secure information storage devices are connected together through one or more communications networks.

Classically, each device may be connected to the network in different ways such as for example: direct connection (for example it possesses a SOAP server in the case of an IP network), a connection by means of a hardware element (such as the interface of a cellphone), software intermediation (in the case of an ISO 7816 or PKCS driver).

The third party is, for example, a service provider such as a bank, an authority, a company etc.

Many functions can be envisaged, among them especially but not exclusively:
functions of authentication of the holder by the third party (performing for example a semi-permanent password type strong authentication, a one-time password or OTP, a secret key challenge or CS or again differentiated use of the two keys of a key pair (PKI));
electronic wallet functions;
etc.

BACKGROUND

The techniques of the prior art and their drawbacks shall now be discussed in the particular case where the secure information storage devices are authentication devices used by the third parties to authenticate the holders of these devices. It is clear however, as already indicated here above, that the invention can be applied regardless of the function or functions used to provide third parties with the information contained in the secure information storage devices.

Applications using secure access can be classified under two categories:
applications using online (synchronous) securing such as for example bankcard applications and mobile telephony (SIM) applications;
applications using deferred-time or offline control securing such as for example applications for secure electronic mail or electronic filing of tax returns.

The authentication architectures implemented in both cases are different and quite exclusive of each other. In the former instance (online securing), the authentication architectures are centralized. In the latter instance (off-line control securing) they are decentralized. The centralized architectures cope poorly with the mutualization of applications from the different service providers because, by nature, that is only one centralized element that performs this authentication.

Strong authentication devices (for example with dual authentication: "what I know", PIN code and "what I have" authentication, smart cards or dongles) have already been implemented in both types of architecture. However, there is no instance where one device lends itself well to different types of strong authentication (OTP, CS, PKI) at the same time and is capable of being an authentication element equally well in centralized or decentralized architectures. On the contrary, the authentication devices are usually specialized in a strong type of authentication as well as in a given architecture, since it is not possible to cross all types of strong authentication with all types of architecture.

In other words, each third party implements authentication devices that are proper to it and specific to a method of authentication (OTP, CS, PKI etc.) and to an authentication infrastructure (centralized or decentralized architecture). The costs of investment and exploitation are therefore not mutualized among different third parties. The management of the authentication devices is cumbersome because these are hardware devices and each instance calls for a specific recording infrastructure with specific learning costs and costs induced by the absence of mutualization.

To overcome this problem, several technical solutions have been proposed such as for example the one called "Global Open Platform" (cf. "Global Platform Smart Card Management System Functional requirements, version 4.0"), enabling several third parties (service providers) to use one and the same smart card type authentication device without being linked to the entity (also called an operator) that manages cards (especially their supply and issue).

However, this prior art technique is not optimal because, at the end of a pre-customizing phase, it makes use of trustworthy third parties to make the third party service provider independent of the operator.

Furthermore, this prior art technique is extremely rigid because the card issuer must, if possible, have advance knowledge of the applications that will be placed in the card. Novel applications can be downloaded during the service life of the card. However, it is the entire image of the card that will have to be reloaded.

SUMMARY

A method is provided of communications between a secure information storage device and at least one third party with which said information is exchanged, an entity carrying out the management of a plurality of secure information storage devices to which said device belongs. This method includes the following steps:
- the entity places, in a secure container included in said device and specific to a given third party, an authorization of communication between the secure container and said given third party;
- the entity sends the given third party an identifier of the device, an address of the device within a communications network, an identifier of the secure container and said authorization of communication;
- the given third party attempts to set up communications with the secure container in using the address of the device, the identifier of the device, the identifier of the secure container and the authorization of communication;
- before accepting communications between the given third party and the secure container, the device checks that the authorization of communication transmitted by the third party is acceptable in the light of the authorization of communication previously placed by the entity in the secure container.

The general principle of an embodiment of the invention therefore includes the placing, after the device has been handed over to a holder, in a secure container included in this device, of an authorization of communication between this secure container and a third party, this authorization of communication conditioning any subsequent acceptance by the device of a communication between this secure container and this third party.

The communication between the secure container and the third party is aimed at enabling the third party to place, use or modify information in the secure container. Thus, an embodiment of the invention enables a third party to carry out a first customizing operation or post-customizing operation of a secure container included in a device after the device has been handed over to a holder (i.e. by downloading).

It is important to note that the entity plays an essential role in the mechanism of placing of a authorization of communication in the secure container in guaranteeing that the secure container is used only by the third party to which it has been assigned.

In a preferred embodiment of the invention, the method furthermore comprises the following steps, performed after the communication between the secure container and the given third party has been accepted:
- the given third party sends the secure container a first authorization of access specific to the given third party for the secure container;
- the secure container stores said first authorization of access so that only the given third party, that has the first authorization of access, is subsequently authorized by the secure container, independently of the entity, to use and modify the information contained in the secure container.

Thus, after the secure container has stored the first specific authorization of access to the given third party, the information contained in the secure container is solely under the control of this third party and inaccessible both to the entity and to other third parties (should the device be mutualized among several third parties). The given third party can then directly access its secure container without intervention by the entity and therefore without a re-implementing the above-mentioned mechanism (based on the depositing by the entity, in the secure container, of an authorization of communication between the third party and the secure container).

In other words, in this preferred embodiment of the invention, the management-related aspect of the device (and especially the issuing of this device) are separated from the aspect pertaining to the function performed with the information contained in the secure container. Indeed, it is the entity (operator) that carries out the management of the device whereas it is the third party that performs the above-mentioned function.

This separation makes the architecture of authentication of the device by the entity independent of the authentication method implemented by the third party to authenticate the device-holder. In other words, in this case, the solution of an embodiment of the invention does not dictate a model of architecture (centralized or decentralized) and is not linked to a method of authentication (OTP, CS, PKI . . . ) which would be common to all the third parties.

Advantageously, the method furthermore comprises the following steps:
- the entity sends the device a request for revocation of said first authorization of access specific to the given third party for the secure container;
- the device revokes the first authorization of access specific to the given third party for the secure container.

Thus, the entity does not know the first authorization of access specific to the third party but can revoke it, for example at the request of the device-holder (in the event of loss, theft, etc) or of the third party (in the event of revocation of the device-holder or non-renewal of a contract between the entity and the third party).

Advantageously, the step of revocation of the first authorization of access is preceded by the following step: the device authenticates the entity with a second authorization of access preliminarily given by the entity and placed by the device, before agreeing to revoke the first authorization of access specific to the given third party for the secure container.

According to an advantageous characteristic, the step of placing the authorization of communication in the secure container is preceded by the following steps:
- the entity transmits a request for placing said authorization of communication in the secure container to the device;
- the device authenticates the entity with a third authorization of access preliminarily given by the entity and placed in the device before accepting the placing of the authorization of communication in the secure container.

It must be noted that the second and third authorizations of access, specific to the entity, may be one and the same.

In an advantageous embodiment of the invention, the step of placing the authorization of communication in the secure container is preceded by the following step: the given third party requests the entity to place the authorization of communication between the given third party and the secure container in the secure container, the given third party giving the entity the identifier of the device.

Advantageously, after the communication between the secure container and the given third party has been accepted, the given third party sends information to the secure container so that the secure container stores it.

Preferably, the information stored in the secure container belongs to the group comprising data and programs.

Advantageously, the information stored in the secure container can be used to fulfill a function belonging to the group comprising:
- the authentication by the given third party of a holder of the device;
- electronic wallet;
- authorization to use an apparatus with which the device cooperates;
- maintenance of an apparatus with which the device cooperates;

management of a function of an apparatus with which the device cooperates.

This list is in no way exhaustive.

Advantageously, the given third party is a service provider.

In a particular embodiment of the invention, the invention enables communication between the device and at least two third parties, at least one container specific to each third party being included in the device.

Thus, in this particular embodiment, the device comprises several secure containers that are assigned to different third parties, with at least one container per third party (mutualization of the device). Each third party can deposit and/or use and/or modify information in the secure container that is specific to it, independently of the other third parties (and even independently of the entity, in the preferred case where this third party has placed a first authorization of access, specific to it, in its container).

An embodiment of the invention also relates to a system of communications between a secure information storage devices and at least one third party with which said information is exchanged, an entity carrying out the management of a plurality of secure information storage devices to which said device belongs, characterized in that:

the entity comprises means for placing, in a secure container included in said device and specific to a given third party, an authorization of communication between the secure container and said given third party;

the entity comprises means for sending the given third party an identifier of the device, an address of the device within a communications network, an identifier of the secure container and said authorization of communication;

the given third party comprises means for attempting to set up a communication with the secure container, in using the address of the device, the identifier of the device, the identifier of the secure container and the authorization of communication;

the device comprises means for checking that the authorization of communication transmitted by the given third party is acceptable in the light of the authorization of communication preliminarily placed by the entity in the secure container so that the device accepts communications between the given third party and the secure container only if the checking means decide that the authorization of communication transmitted by the third party is acceptable.

An embodiment of the invention also relates to an entity carrying out the management of a plurality of secure information storage devices to which said device belongs, this entity comprising:

means for placing, in a secure container included in a given device and specific to a given third party, an authorization of communication between the secure container and said given third party;

means for sending the given third party an identifier of the given device, an address of the device within a communications network, an identifier of the secure container and said authorization of communication;

so that the given third party can attempt to set up a communication with the secure container, in using the address of the given device, the identifier of the given device, the identifier of the secure container and the authorization of communication and so that, before accepting communications between the given third party and the secure container, the device checks that the authorization of communication transmitted by the third party is acceptable in the light of the authorization of communication previously placed by the entity in the secure container.

An embodiment of the invention also pertains to a secure information storage device of the type comprising means of communication with at least one third party with which said information is exchanged, this device comprising:

means of storage in a secured container, included in said device and specific to a given third party, of an authorization of communication between the secured container and said given third party, said authorization of communication being placed by an entity providing for the management of a plurality of secure information storage devices to which said device belongs;

means for checking that an authorization of communication transmitted by the given third party is acceptable in the light of the authorization of communication preliminarily placed by the entity in the secure container so that the device accepts communications between the given third party and the secure container only if the checking means decide that the authorization of communication transmitted by the third party is acceptable.

An embodiment of the invention also relates to a third party, of the type comprising means of communication with a secured information storage device, this third party comprising:

means of reception, from an entity carrying out the management of a plurality of secure information storage devices to which said device belongs, of an identifier of the device, an address of the device within a communications network, an identifier of the secure container and an authorization of communication between the secured container and said third party;

means for attempting to set up a communication with the secure container, in using the address of the device, the identifier of the device, the identifier of the secure container and the authorization of communication.

so that, before accepting communication between the third party and the container, the device, can check that the authorization of communication is acceptable in the light of an authorization of communication preliminarily placed by the entity in the secure container.

BRIEF DESCRIPTION OF THE DRAWINGS

Other features and advantages shall appear from the following description of a preferred embodiment given by way of a non-restrictive indication and from the appended drawings, of which:

FIG. 1 shows a phase of initialization of an access of a third party to a secure container included in the device;

FIG. 2 shows a phase of access of the third party to this secure container;

FIG. 3 shows a phase of revocation of a specific authorization of access preliminarily assigned to a third party.

DETAILED DESCRIPTION OF ILLUSTRATIVE EMBODIMENTS

Figure 1:
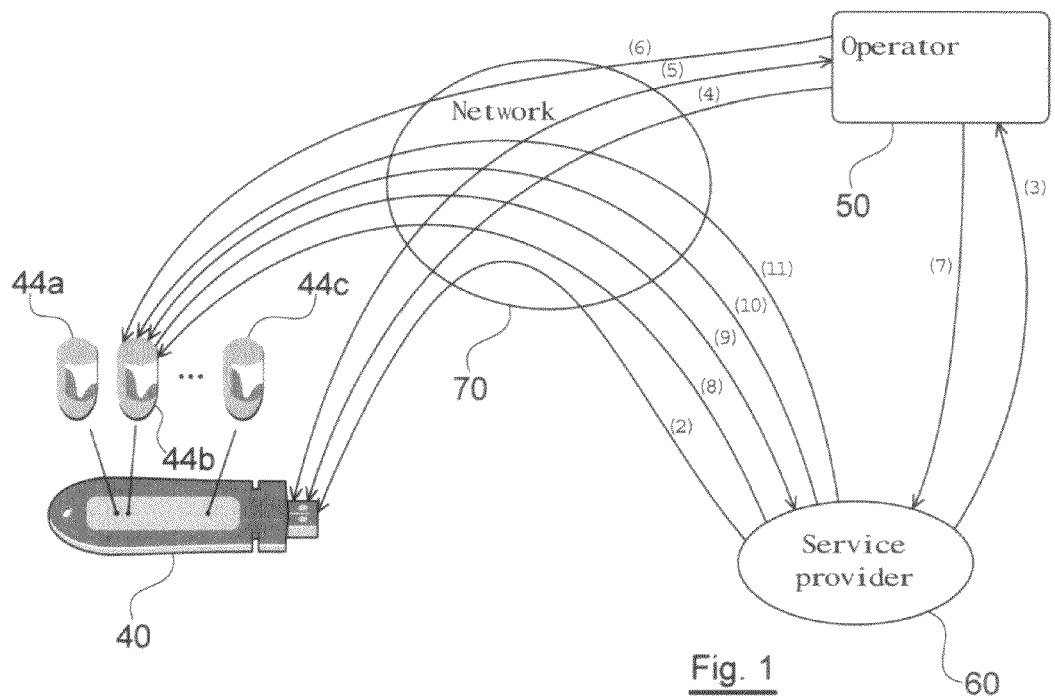
FIGS. 1 to 3 each illustrate a distinct phase of a particular embodiment according to an embodiment of the invention of communication between a secure information storage device and a third party, namely.

In the particular embodiment of the invention described here below, the system comprises:

a plurality of secure information storage devices, for example dongles, each comprising one or more secure containers;

a plurality of holders to whom the secure information storage devices are entrusted;

an entity, here below called an operator, that performs the management (including the distribution) of the secure information storage devices;

one or more third parties, for example service providers (such as banks, administrator authorities, companies etc);

one or more identity providers or IDPs) who may possibly be the same as the operator;

one or more communications networks used to connect the entity (operator), the third parties (service providers), the secure information storage devices (dongles) and the identity providers (IDP).

The operator is the actor that deploys the system and equips the holders. Since each device is individualized from the very outset by an authentication means proper to it, the operator is able to identify and authenticate this device. The operator hires out or sells its secure containers (contained in the devices that it entrusts to the holders) to these service providers. The operator is connected for example to different identity providers (IDP), for example as offset identity providers, entrusted with the authentication of the holders.

As explained in detail here below, the operator has an authorization of access (for example a secret in the cryptographic sense) that is specific to it and enables it to manage the secure contents of a device entrusted to a holder. Using this authorization of access which is specific to it, the operator may especially authorize the acceptance by a given secure container of another authorization of access specific to a given access provider. It may also revoke an authorization of access specific to an access provider without needing to know this provider. In general, the operator remains the guarantor, with respect to the holder and the service providers, of the security, sealed quality and reliability of the total system.

The holders are individuals who have a device entrusted by the operator. The holder uses the device and each secure container included in it as if they as many distinct devices. For example, the secure containers are accessible by application programming interfaces API such as the ISO 7816, PKCS or other type interfaces.

The secure containers included in the devices possess a content that is readable or exploitable only by those who possess rights of access to the secure containers. These rights are delegated by the operator under the control of the holder. The information contained in the secure containers is for example data and programs, for example non-specialist documents, certificates or small programs or applets in the context of multiple use, including especially but not exclusively authentication.

The service provider is an actor that makes a contract with the operator to be able to use the devices deployed by the operator. The operator enables the service provider to propose that the holder should receive on his device (and more specifically in one of the secure containers of this device) information (data and/or programs) which then enable a direct relationship between the service provider and the holder. In the application particular to authentication, the device therefore ensures a "signature bearing" function for one or more service providers.

As is explained in detail here below, each service provider is itself entitled to generate an authorization of access that is specific to it (for example in the form of a secret) which, after it has been authorized by the operator, gives it direct access (i.e. access independently of the operator) to a secure container.

The service provider must implement its own mechanism for the recording of holders as users of secure containers assigned to this service provider. This mechanism especially guarantees the holder's agreement to the use of a secure container of its device by the service provider.

The service provider is identified by an identifier in the device entrusted to the holder. The service provider may access this device when it has obtained a network identification of the device, authenticated by an identity provider (IDP).

The identity provider is capable of authenticating a secure information storage device at a given network address. The authentication method is of no importance for the device. The identity provider gives a pointer which may or may not be anonymous to the service provider in response to an authentication request.

Here below in the description, it is assumed by way of an example that the secure information storage device is a dongle (a USB stick for example). It is clear however that an embodiment of the invention can also be applied with any other type of embodiment, hardware or software, of this device (for example in the form of a smartcard).

Referring to FIG. 1, we present a first phase of a particular embodiment of the method for communication between a secure information storage device (a dongle) and a third party (a service provider). This first phase is a phase of initialization of an access of the service provider to a secure container included in the device.

In a first step (not shown), the final user (a terminal) has a dongle 40 comprising several secure containers (three in the example illustrated) 44a, 44b and 44c. This dongle 40 necessitates an identifier, possibly the same as the address of this dongle in a communications network 70.

In a second step (2), a service provider 60 which seeks to communicate with one of the secure containers (for example referenced 44b) identifies the dongle 40. It is assumed here that the holder of the dongle is a customer of this service provider.

In a third step (3), the service provider 60 addresses an operator 50 who manages the dongles and the secure containers contained in the dongles, to request the operator 50 to place an authorization of communication with a given secure container (for example the one referenced 44b). The service provider sends the operator at least the identification of the dongle (for example the serial number as printed on the dongle of the customer or the anonymous "handle" of an identity provider (IDP) or again the identification number such as can be read in the identification certificate of the dongle if the choice made were to be that of the implementation of an identification of the dongle by a PCI certificate or an anonymous authentication certificate).

In an optional step (not shown) (option a), the service provider 60 asks the operator 50 for an identifier of the secure content 44b that is assigned to the service provider with respect to this customer. This step is optional because in another implementation (option B), the operator gives this piece of information to the service provider as soon as the contract that binds them is set up.

In a fourth step (4), the operator 50 makes a request to the dongle 44 for placing information in the concerned secure container 44b.

In a fifth step (5), the dongle 40 authenticates the operator 50 by means of an authorization of access (a secret) specific to the operator, which has been placed at the time of the customizing of the dongle before it is commercially distributed.

In a sixth step, the operator 50 places, in the secure container 44b, the authorization of communication between this secure container and the service provider 60.

In a seventh step (7), the operator 50 sends the following as a minimum to the service provider 60 on the network 70: the identifier of the dongle 40 concerned, the network address of the dongle, the identifier of the secure container 44*b* and the above-mentioned authorization of communication.

In an eighth step (8), the service provider 60 directly addresses the secure container 44*b* of the dongle 40, since it knows the identifier and the network address of the dongle as well as the identifier of the secure container 44*b*, and gives the above-mentioned authorization of communication.

In a ninth step (9), the dongle 40 makes a prior check of the above-mentioned authorization of communication, before accepting the communication between the secure container 44*b* and the service provider 60. More specifically, this verification is performed for example by the operating system of the dongle, and in the event of a positive result this dongle asks the operating system of the secure container to accept the secret that the service provider will give it through the above-mentioned communication (see description of FIG. 4).

Figure 2:
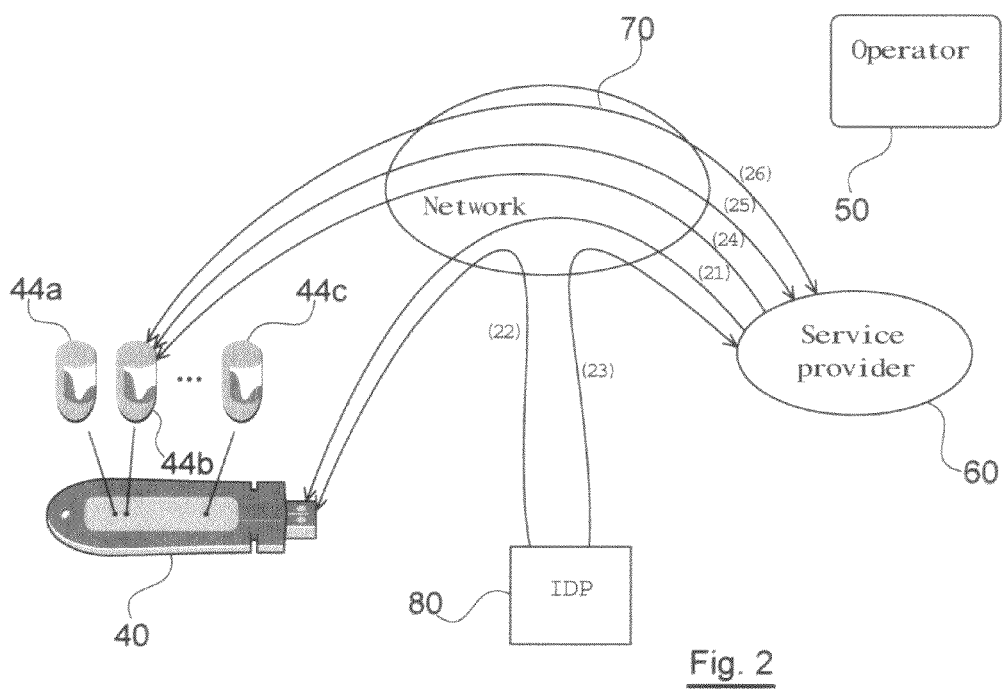

In this 10th step (10), the service provider 60 sends the secure container 44*b* its own authorization of access to this secure container in order that it may be stored therein for subsequent use (i.e. whenever the service wider wishes to communicate again with the secure container 44*b*; see description of FIG. 2). In this way, the access provider becomes independent of the operator. The operator does not know this authorization specific to the service provider. It therefore cannot use it without the knowledge of the service provider. On the contrary, it has the power to revoke it (see description of FIG. 3).

In an 11th step (11), the service provider 60 can now place data and programs in the secure container 44*b* which will be under its sole control and inaccessible to the other service providers as well as to the operator 50.

Thus, it is the operator that ensures the sealed quality of the secure containers. Only the service provider that has placed information in a secure container can access this information, and it is unaware of the identity of the service providers using the other secure containers of the same dongle and the nature of the information placed therein.

Figure 4:
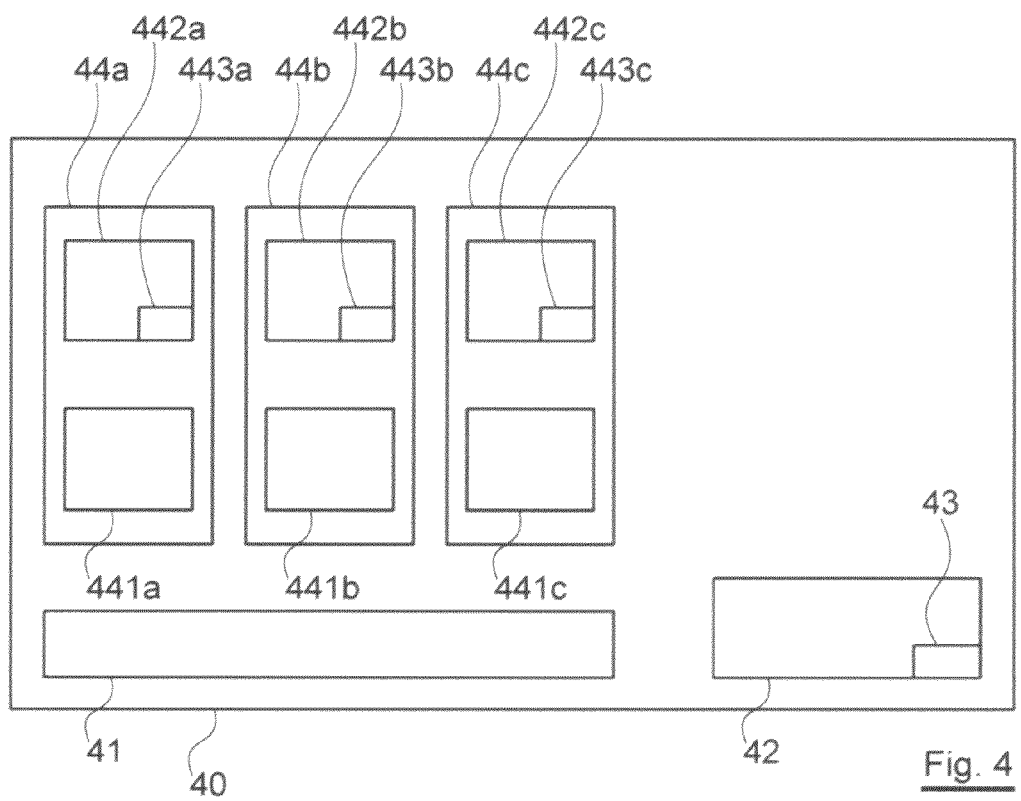
FIG. 4 presents a functional block diagram of a particular embodiment of the secure storage device of the invention.

Referring now to FIG. 4, we present a particular embodiment of the secure storage device of the invention.

In this embodiment, the device 40 comprises an operating system (OS) 41, a memory zone 42 and three secure containers 44*a*, 44*b* and 44*c*. The invention is of course not limited to this particular value of the number of secure containers.

The memory zone 42 stores especially the authorization of access 43 specific to the operator (see above discussion on the fifth step (5) of the initialization phase illustrated in FIG. 1).

Each secure container 44*a*, 44*b* or 44*c* comprises an operating system (OS) 441*a*, 441*b* or 441*c*, as well as a memory zone 442*a*, 442*b* or 442*c*. The operating system (OS) of each secure container may also be seen as the lower layers of an information-processing stack. Each memory zone 442*a*, 442*b* or 442*c* stores especially the authorization of access 443*a*, 443*b* or 443*c* specific to the service provider (see discussion here above on the 10th step (10) of the initialization phase illustrated in FIG. 1).

More particularly, the operating system (native program (OS)) 41 of the device 40 has for example functions similar to those of the operating system itself as a medium of the virtual operating systems such as CP/CMS (also called VM/370) or again to an application server. Thus, it may bring about the operation of different virtual machines, corresponding to the different secure containers, in completely virtual, separate and isolated memory spaces and systems of finals. In other words, each virtual machine is the support of a "secure container" function. It governs access to permanent or volatile data as well as the execution of programs, for example by means of the API ISO 7816 or PKCS standards.

The operating system 41 of the device 40 is also responsible for relations with the service provider, the operator and the identity providers (IDP). Each secure container knows the secret shared with the service provider. The secret has been downloaded under the control of the operating system 41 of the device 40. It is this operating system 41 which can permit a secure container to accept a new secret shared with a service provider without thereby knowing this secret which is in the field of the virtual machine and, by construction of the device 40, unknown to the operating system 41 of this device.

The working memory space of each secure container is completely accessible to another secure container. Each virtual machine is therefore unaware of the existence of other virtual machines and expects to benefit from all the potential of the device. It is possible, as the case may be, to reserve memory resources which will be used by only one of the secure containers.

Each secure container may accept or provide data to/from the exterior ("over the air" data) securely because there is a shared secret between this container and the assignee of this container (the service provider). This secret may be changed by the operator under the control of the operating system of the device, depending on the progress of the assignees (the service providers) of the secure containers. There is for example a database in the device to have knowledge of the identification of the service providers entitled to use a secure container. For each secure container, this base comprises a doublet comprising an identifier of the service provider, and the secret shared with the service provider. To enable the updating of the secrets for access to the secure containers, there is also an authentication of the operator's platform by means of another shared secret. The secret is implanted at the time of manufacture in a protected zone. In order that the assignee of a secure container may communicate with this container, there should be an identifier of the device which can be obtained through the operator's authentication system.

Referring now to FIG. 2, we present the second phase of the particular embodiment of the method of the invention, namely a phase of access by the service provider 60 to the secure container 44*b* that has been assigned to it.

It is assumed that the first phase described here above with reference to FIG. 1 has already been effected and that, therefore, the secure container 44*b* stores especially the authorization of access specific to the service provider 60.

In a first step (21), the service provider 60 asks the holder of the dongle 40 to identify itself with an identity provider (IDP) 80 in order to know the correspondence between the network address of the dongle and the identity of the holder.

It must be noted that there are two methods of access to the dongle 40 for a service provider 60: either the service provider is capable of direct online dialogue with the dongle or the service provider requests the operator to authenticate the dongle (itself or by means of an IDP). The utility of the second approach (which is the one described here above and illustrated in FIG. 2) is that it prevents a service provider unrelated to the operator from obtaining a form of authentication of the dongle and hence of the holder, either by sending a constant random value enabling it to always obtain the same response from a given dongle or by obtaining read access to a secure container which is free in read mode to find recurrent information therein. The aim here is to preserve the business interests of the service providers who have made agreements with the operator.

In a second step (22), if the service provider 60 has a relationship with the identity provider (IDP) 80, this identity provider sets up an authentication.

In the third step (23), if this authentication is valid, the identity provider (IDP) informs the service provider that there is an identified holder at this network address. This is the case whatever the authentication method (PKI, OTP, secret key challenge, etc). The transmission of this information to the service provider may be done either directly by an "off-band channel" or by a cookie on the navigator, i.e. a couple (identifier of the holder, network address of the dongle). The service provider therefore knows the dongle through the identifier and knows how to address it through the network address.

In a fourth step (24), the service provider 60 can therefore directly address the secure container 404B of the dongle to ask it for an operation, for example by means of the API ISO 7816 or PKCS standards. This request is received by the operating system (OS) of the dongle 40 which will make a search to find out which secure container is the destination container of the request.

The fifth step (25) is described here below. The problem on the dongle 40 side is that of obtaining protection against illegal attempts to access a secure container. The operating system of the secure container is entrusted with this control. To this end, it must know the identity of the service provider 60. If this identity is one of the service providers authorized to access this secure container 40b, it is furthermore necessary that the operating system or the secure container should know that this service provider 60 has legal access to the secure container 44b (this piece of information has been given by the operator through the operating system of the dongle), and that it authenticates the service provider. It does so for example through a secret key challenge. To be able to make this challenge, the dongle should be capable of sending requests to the service provider through the network. As the case may be, the dongle may have its own network interface or may call upon an external interface. Depending on whether this authentication succeeds or fails, the service provider 60 may or may not communicate with the secure container 44b.

In a sixth step (26), should the communication be possible, the rest of the exchange can be done by means of a classic protocol such as the ISO 7816, PKCS or another protocol. This protocol is supported by the operating system of the secure container 44b through the operating system of the dongle 40 to give the service provider 60 the experience of having an element that is an actor in their chosen protocol.

Figure 3:
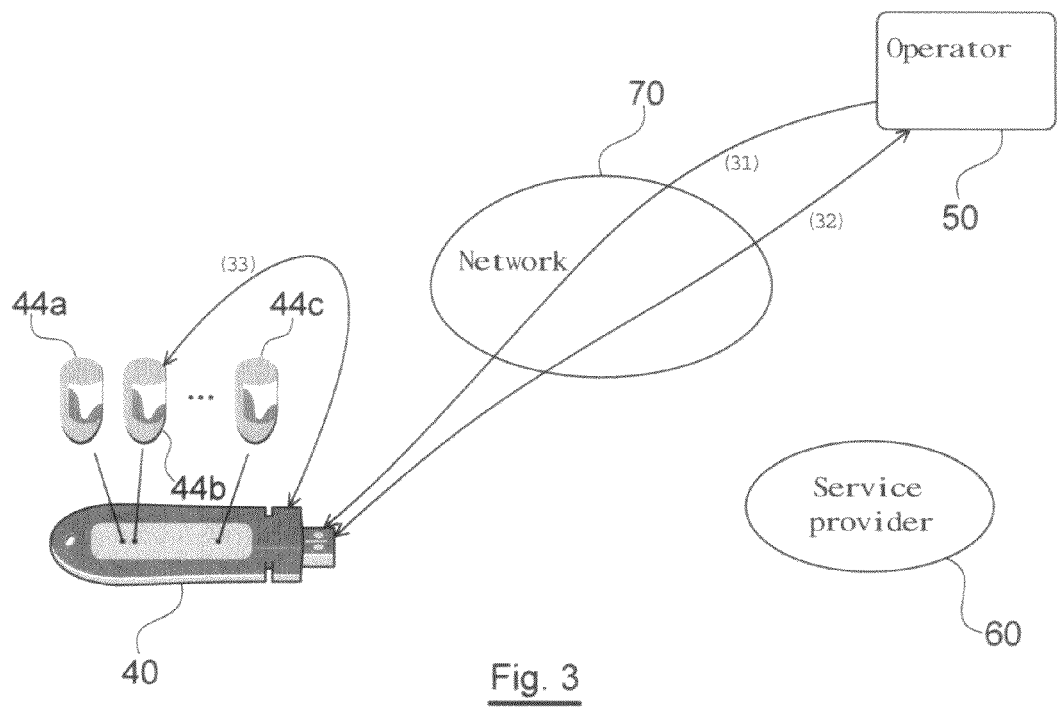

Referring now to FIG. 3, we present a third phase of the particular embodiment of the method of the invention, i.e a phase of revocation of an authorization of access preliminarily assigned to the service provider 60 (third party) for a given secure container 44b of the dongle 40.

It is assumed that the first phase described here above with reference to FIG. 1 has already been performed and, therefore, that the secure container 44b stores especially the authorization of access specific to the service provider 60.

In a first step (31), the operator 50 requests the dongle 40 for revocation of this authorization of access specific to this service provider 60 for this secure container 44b.

In a second step (32), the dongle 40 authenticates the operator 50 by means of an authorization of access (a secret) that is specific to the operator and has been placed at the time of the customization of the dongle, before it is commercially distributed.

In a third step (33), the operating system (OS) of the dongle passes on this request to the concerned secure container 44b, which performs the requested revocation.

At least one embodiment of the disclosure provides a technique of communications between a secure information storage device and at least one third party, enabling the third party to deposit and/or reduce and/or modify information securely and during the service life of the device in a secure container included in the device and specific to this third party.

Thus, the disclosure especially but not exclusively enables the performance by a third party, during the service life of the device, of a first customizing operation (which replaces the classic in-plant pre-customizing operation) or a post-customizing operation (if a classic in-plant pre-customizing operation or a first customizing operation has already been performed) for a secure container included in the device and assigned to this third party.

At least one embodiment provides a technique of this kind such that several third parties each have a specific secure container included in a same device (mutualization of the device) and such that each third party can deposit and/or use and/or modify information in the secure container that is specific to it, independently of the other third parties. In particular, but not exclusively, each third party should be capable of customizing the content of its secure container independently of the other third parties and of the content of the other secure containers included in the same device.

At least one embodiment provides a technique of this kind to prohibit access to a secure container by the device management entity as well as by other third parties (should the device includes several secure containers assigned to different third parties).

At least one embodiment provides a technique of this kind wherein the device management entity (operator) acts as a responsible actor to whom the device-holders can turn in the event of problems with their devices (stopping payment, replacement etc) and as a guarantor of freedom and privacy of the holders (protection of the holders' data against unauthorized access or even illegal access by third parties).

Should the information stored in a secure container be used by a third party to authenticate the device-holder, the disclosure provides a technique of this kind that is not linked to an authentication method and does not dictate a centralized or decentralized architecture model.

Although the invention has been described here above with reference to a limited number of embodiments, those skilled in the art will understand, from reading this description, that other embodiments can be conceived of without departing from the scope of the present invention. As a consequence, the scope of the invention is limited only by the attached claims.

The invention claimed is:

1. A method comprising:
communicating between a secure information storage device, among a plurality of secure information storage devices, and at least one third party with which said information is exchanged, an entity carrying out management of the plurality of secure information storage devices, wherein communicating comprises the following steps:
the entity places directly, in a secure container included in said secure information storage device and specific to a given third party, an authorization of communication between the secure container and said given third party;
the entity sends the given third party
(a) an identifier of the secure information storage device,
(b) an address of the secure information storage device within a communications network,
(c) an identifier of the secure container and
(d) said authorization of communication;
the given third party attempts to set up communications with the secure container in using only the following elements:
(a) the address of the secure information storage device,
(b) the identifier of the secure information storage device,
(c) the identifier of the secure container and
(d) the authorization of communication; and
before accepting communications between the given third party and the secure container, the secure information storage device checks that the authorization of communication transmitted by the third party is acceptable in the light of the authorization of communication previously placed by the entity in the secure container.

2. The method according to claim 1, wherein the method furthermore comprises the following steps, performed after the communication between the secure container and the given third party has been accepted:
the given third party sends the secure container a first authorization of access specific to the given third party for the secure container; and
the secure container stores said first authorization of access so that only the given third party, that has the first authorization of access, is subsequently authorized by the secure container, independently of the entity, to use and modify the information contained in the secure container.

3. The method according to claim 2, wherein the method furthermore comprises the following steps:
the entity sends the secure information storage device a request for revocation of said first authorization of access specific to the given third party for the secure container; and
the secure information storage device revokes the first authorization of access specific to the given third party for the secure container.

4. The method according to claim 3, wherein the step of revocation of the first authorization of access is preceded by the following step:
the secure information storage device authenticates the entity with a second authorization of access preliminarily given by the entity and placed by the secure information storage device, before agreeing to revoke the first authorization of access specific to the given third party for the secure container.

5. The method according to claim 1, wherein the step of placing the authorization of communication in the secure container is preceded by the following steps:
the entity transmits a request for placing said authorization of communication in the secure container to secure information storage the device; and
the secure information storage device authenticates the entity with an authorization of access preliminarily given by the entity and placed in the secure information storage device before accepting the placing of the authorization of communication in the secure container.

6. The method according to claim 1, wherein the step of placing the authorization of communication in the secure container is preceded by the following step:
the given third party requests the entity to place the authorization of communication between the given third party and the secure container in the secure container, the given third party giving the entity the identifier of the secure information storage device.

7. The method according to claim 1 wherein, after the communication between the secure container and the given third party has been accepted, the given third party sends information to the secure container so that the secure container stores the information.

8. The method according to claim 1, wherein the information stored in the secure container belongs to the group consisting of data and programs.

9. The method according to claim 1, wherein the information stored in the secure container can be used to fulfill a function belonging to the group consisting of:
the authentication by the given third party of a holder of the secure information storage device;
electronic wallet;
authorization to use an apparatus with which the secure information storage device cooperates;
maintenance of an apparatus with which the secure information storage device cooperates;
management of a function of an apparatus with which the secure information storage device cooperates.

10. The method according to claim 1, wherein the given third party is a service provider.

11. The method according to claim 1, wherein the method enables communication between the secure information storage device and at least two third parties, at least one container specific to each third party being included in the secure information storage device.

12. A system of communications comprising:
a secure information storage device, among a plurality of secure information storage devices,
at least one third party with which information is exchanged, and
an entity carrying out management of the plurality of secure information storage devices, wherein:
the entity comprises means for placing directly, in a secure container included in said secure information storage device and specific to a given third party, an authorization of communication between the secure container and said given third party;
the entity comprises means for sending the given third party an identifier of the secure information storage device, an address of the secure information storage device within a communications network, an identifier of the secure container and said authorization of communication;
the given third party comprises means for attempting to set up a communication with the secure container, using only the following elements:
the address of the secure information storage device,
the identifier of the secure information storage device,
the identifier of the secure container, and
the authorization of communication; and
the secure information storage device comprises means for checking that the authorization of communication transmitted by the given third party is acceptable in the light of the authorization of communication preliminarily placed by the entity in the secure container so that the secure information storage device accepts communications between the given third party and the secure container only if the checking means decide that the authorization of communication transmitted by the third party is acceptable.

13. An entity carrying out management of a plurality of secure information storage devices to which a given secure information storage device belongs, this entity comprising:
means for placing directly, in a secure container included in the given secure information storage device and specific to a given third party, an authorization of communication between the secure container and said given third party; and
means for sending the given third party an identifier of the given secure information storage device, an address of the given secure information storage device within a communications network, an identifier of the secure container and said authorization of communication,
wherein the means for placing and for sending are configured so that the given third party can attempt to set up a communication with the secure container, using only the following elements: the address of the given secure information storage device, the identifier of the given secure information storage device, the identifier of the secure container and the authorization of communication and so that, before accepting communications between the given third party and the secure container, the given secure information storage device checks that the authorization of communication transmitted by the third party is acceptable in the light of the authorization of communication previously placed by the entity in the secure container.

14. A secure information storage device for communication with at least one third party with which information is exchanged, wherein the secure information storage device comprises a plurality of secure containers wherein:

each container comprises, an authorization of communication between the secure container and a specific given third party, said authorization of communication being placed by an entity providing for management of a plurality of secure information storage devices to which said secure information storage device belongs; and said secure information storage device comprises means for checking that an authorization of communication transmitted by a third party is acceptable in the light of the authorization of communication preliminarily placed by the entity directly in one of the plurality of secure containers so that the secure information storage device accepts communications between the third party and the secure container only if the checking means decide that the authorization of communication transmitted by the third party is acceptable.

15. A third party apparatus for communication with a secured information storage device, the third party apparatus comprising:

means for receiving, from an entity carrying out management of a plurality of secure information storage devices to which said secure information storage device belongs, an identifier of the secure information storage device, an address of the secure information storage device within a communications network, an identifier of a secure container included in said secure information storage device, and an authorization of communication between the secure container and said third party apparatus; and means for attempting to set up a communication with the secure container, using only the following elements: the address of the secure information storage device, the identifier of the secure information storage device, the identifier of the secure container and the authorization of communication, wherein the means for receiving and the means for attempting to set up a communication are configured so that, before accepting communication between the third party apparatus and the container, the secure information storage device can check that the authorization of communication is acceptable in the light of an authorization of communication preliminarily placed by the entity in the secure container.

* * * * *